(12) United States Patent
Ho (10) Patent No.: US 7,886,310 B2
(45) Date of Patent: Feb. 8, 2011

(54) RAID CONTROL METHOD AND CORE LOGIC DEVICE HAVING RAID CONTROL FUNCTION

(75) Inventor: Kuan-Jui Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 860 days.

(21) Appl. No.: 11/832,253

(22) Filed: Aug. 1, 2007

(65) Prior Publication Data
US 2008/0034380 A1 Feb. 7, 2008

(30) Foreign Application Priority Data
Aug. 3, 2006 (TW) ............................... 95128540 A (51) Int. Cl.
*G06F 13/00* (2006.01)
(52) U.S. Cl. .................. 719/325; 710/74; 711/114; 714/42
(58) Field of Classification Search ................. 719/325; 710/74; 711/114; 714/42
See application file for complete search history.

(56) References Cited

U.S. PATENT DOCUMENTS

| | | | |
|---|---|---|---|
| 6,353,895 B1 * | 3/2002 | Stephenson | 714/5 |
| 7,623,134 B1 * | 11/2009 | Danilak | 345/568 |
| 2002/0007438 A1 * | 1/2002 | Lee | 711/114 |
| 2003/0018851 A1 | 1/2003 | Ikeuchi et al. | |
| 2004/0268037 A1 | 12/2004 | Buchanan et al. | |
| 2005/0289361 A1 | 12/2005 | Sutardja | |
| 2006/0026328 A1 | 2/2006 | Li | |

FOREIGN PATENT DOCUMENTS

| | | |
|---|---|---|
| TW | 200426670 | 12/2004 |
| TW | 200417859 | 4/2009 |

* cited by examiner

*Primary Examiner*—Andy Ho
(74) *Attorney, Agent, or Firm*—Kirton & McConkie; Evan R. Witt (57) ABSTRACT

In a computer system including a central processing unit, a system memory, a south bridge module, a north bridge module and multiple hard disk drives, a RAID control function is exhibited. The method includes steps of: issuing a command addressing to the south bridge module by the central processing unit; and performing a fault-tolerant computing operation in the north bridge module while exempting from transmitting the command to the south bridge module when the command contains a specified address data.

16 Claims, 6 Drawing Sheets

RAID CONTROL METHOD AND CORE LOGIC DEVICE HAVING RAID CONTROL FUNCTION

FIELD OF THE INVENTION

The present invention relates to a core logic device, and more particular to a core logic device of a computer system having a RAID control function. The present invention also relates to a RAID control method, and more particularly to a RAID control method for use in a computer system.

BACKGROUND OF THE INVENTION

Due to the amazing power of computers, computers are widely used to implement diversified tasks such as data processing tasks, amusement-related tasks or communication tasks. With the increasing development of digitalized generation, the data storage density for the conventional data storage media might become unsatisfactory soon for receiving and storing a great amount of data. For dealing with such a problem, a single data storage medium with a very large quantity of storage capacity or a plurality of data storage media are used in a computer system. Conventionally, data stored in a data storage medium are read via a disk drive that is operated mechanically. Therefore, the operating speed of the disk drive likely fails to catch up with the high processing speed of the central processing unit (CPU). For matching the operating speed of the disk drive and the processing speed of the central processing unit, a configuration of RAID (Redundant Array of Inexpensive Disk) is proposed. In the RAID system, multiple disk drives are used to store the same data in order to increase the data transfer rate and data security. In a case that one of the multiple disk drives has a breakdown, the lost data can be restored according to an interactive encoding technology among the disk drives.

Figure 1:
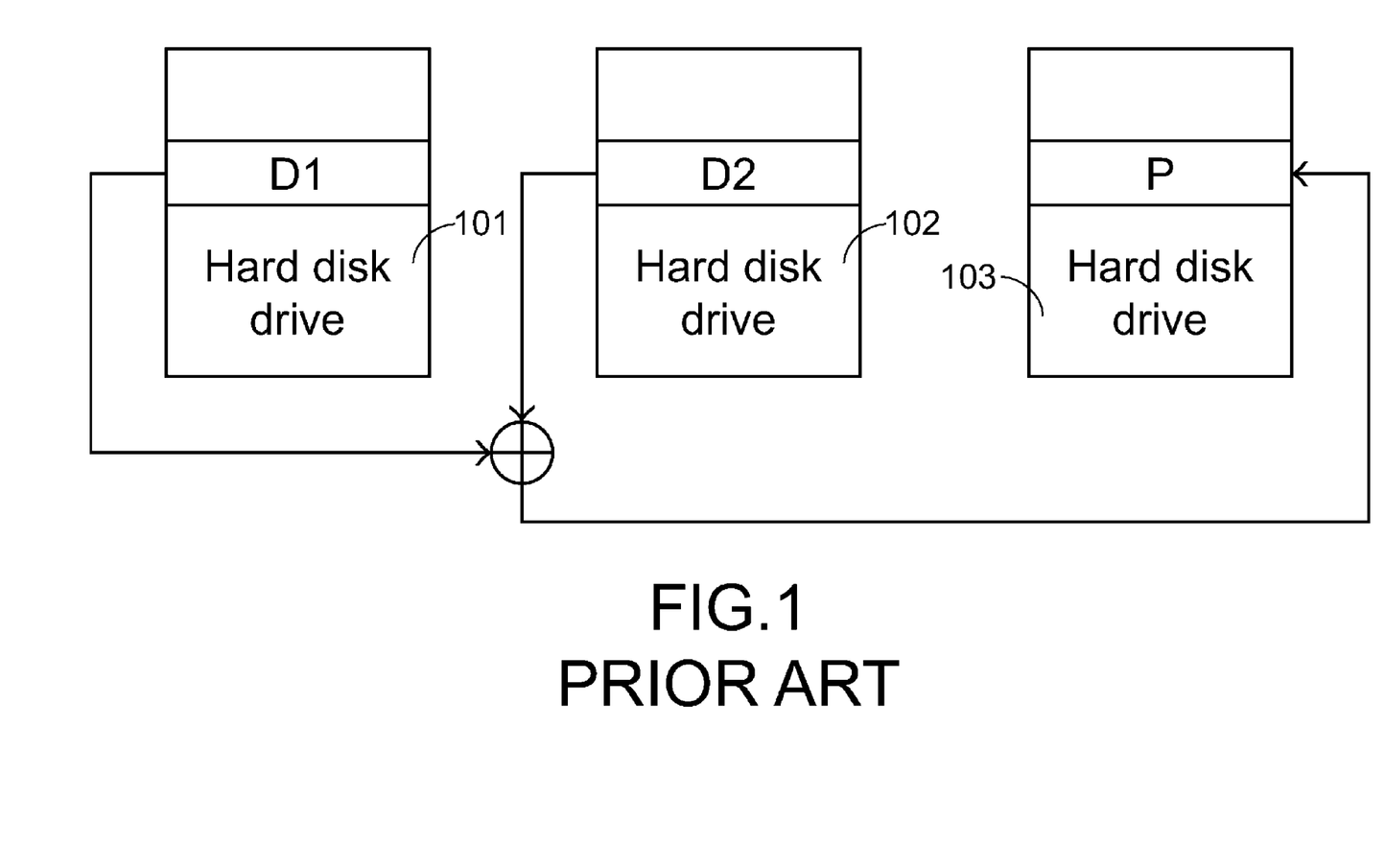
FIG. 1 is a schematic diagram of a conventional RAID configuration.

Referring to FIG. 1, a RAID configuration is schematically illustrated. The RAID system includes three hard disk drives 101, 102 and 103 and exhibits a parallel-with-parity function. The hard disk drives 101 and 102 are used to store respective data while the third hard disk drive 103 is for storing parity data obtained by operating the data in the hard disk drives 101 and 102 for securing data. For example, assuming a data D1 is stored in a first block of the hard disk drive 101, and a data D2 is stored in a second block of the hard disk drive 102, wherein the first block and the second block have the same addresses. Meanwhile, in a third block of the hard disk drive 103 having the same address as the first and second blocks, a polarity data P, which is obtained by way of an exclusive OR gate (XOR) operation of the data D1 and D2 and expressed as $P = D1 \oplus D2$, is stored.

With the presence of polarity data, associated data, if lost, can be rebuilt. For example, if the hard disk drive 102 is damaged so as to lose the data D2, then the data D1 and the polarity data P can be read from the hard disk drives 101 and 103 to perform a logical XOR operation $D1 \oplus P$, thereby rebuilding the data D2. In principle, all the data previously stored in the damaged hard disk drive 102 can be rebuilt based on the corresponding data in the first and third hard disk drives 101 and 103, and stored back to the hard disk drive 102 after it is fixed up. It is understood that for offering the fault-tolerant benefits of RAID, it is necessary, when a data in one of the hard disk drives is overwritten, to make additional efforts to read and write data from/to hard disk drives other than the hard disk drive actually accessed. For example, in a case that the data D1 is refreshed as D1', the data D2 stored in the hard disk drive 102 needs to be read out and subjected to a XOR operation with the data D1' to update the polarity data in the hard disk drive 103 to $P' = D1' \oplus D2$.

Figure 2:
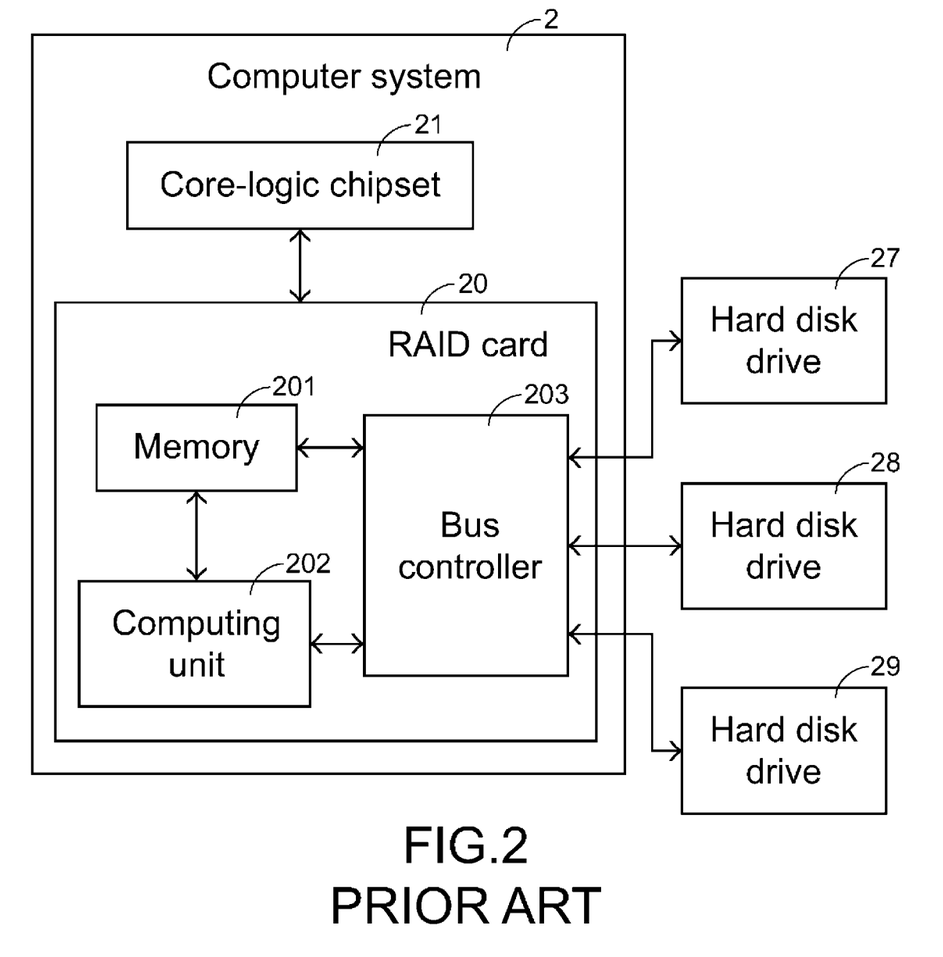
FIG. 2 is a schematic functional block diagram of a RAID card applied to a computer system according to prior art.

Since general self-supporting RAID systems are undesirable in cost and size, a cost-effective RAID card capable of being integrated into a computer casing is developed. Referring to FIG. 2, a schematic block diagram of a RAID card used with a computer system is illustrated. The RAID card 20 is to be mounted in a computer system 2 and electrically connected to a core-logic chipset 21 of the computer system 2. By executing a RAID card driver, the RAID card 20 is made communicable with the operating system of the computer system 2 for reading and writing tasks. The RAID card 20 principally includes a memory 201 serving as a data buffer, a computing unit 202 for fault-tolerant computing, and a bus controller 203. In this embodiment, the RAID card 20 is in communication with three hard disk drives 27, 28 and 29 which are accessed via the bus controller 203.

As described above, the RAID card 20 needs the memory 201 for data buffering. Generally, with the increase of the storage space of the memory 201, which is desired for the enhancement of access efficiency, the cost of the RAID card 20 undesirably increases. Then the advantages achievable by the RAID card is adversely affected For assuring of cost-effectiveness, a software RAID system with the memory 201 and the computing unit 202 being exempted from the RAID card 20 is developed. By executing RAID software, the system memory and the central processing unit of the computer system are responsible for data buffering and fault-tolerant computing. Since no additional hardware components (e.g. the memory 201 and the computing unit 202) are required, the cost of the software RAID system is reduced. The software RAID system, however, may impair the performance of the computer system because the system memory and the central processing unit of the computer system are additionally occupied to execute the RAID function.

SUMMARY OF THE INVENTION

The present invention provides a core logic device having a RAID control function so as to exempt from using a RAID card.

The present invention provides a core logic device having a RAID control function so as to exempt from occupying the CPU resource.

The present invention provides a RAID control method having a fault-tolerant computing function performed in a north bridge module of a computer system.

In an embodiment, the present invention relates to a core logic device of a computer system having a RAID control function. The computer system includes a central processing unit, a system memory and multiple hard disk drives. The core logic device includes a south bridge module disposed therein a hard disk drive controller in communication with the hard disk drives for controlling the access to the hard disk drives; and a north bridge module disposed therein an address identifying unit in communication with the central processing unit for discriminating a command received from the central processing unit, and a fault-tolerant data computing unit in communication with the address identifying unit and the system memory for receiving the command optionally transferred by the fault-tolerant data computing unit and executing a fault-tolerant computing operation of specified data in the system memory according to the command.

In another embodiment, the present invention relates to a core logic device of a computer system having a RAID control function. The computer system includes a central processing unit, a system memory and multiple hard disk drives. The core logic device includes a hard disk drive controller in communication with the hard disk drives for controlling the access to the hard disk drives; an address identifying unit in communication with the central processing unit for discriminating a command received from the central processing unit; and a fault-tolerant data computing unit in communication with the address identifying unit and the system memory for receiving the command optionally transferred by the fault-tolerant data computing unit and executing a fault-tolerant computing operation of specified data in the system memory according to the command.

In a further embodiment, the present invention relates to a RAID control method for use in a computer system. The computer system includes a central processing unit, a system memory, a south bridge module, a north bridge module and multiple hard disk drives. The RAID control method includes steps of: issuing a command addressing to the south bridge module by the central processing unit; and performing a fault-tolerant computing operation in the north bridge module while exempting from transmitting the command to the south bridge module when the command contains a specified address data.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

As described above, fault-tolerant computing operations are essential to RAID control, but the implementation of the fault-tolerant computing function with an additional RAID card would not be cost-effective enough. The present invention thus imparts the fault-tolerant computing function to an existing device in the computer system, e.g. a core logic device, so as to reduce cost and size. Preferably but not necessarily, an existing memory such as a system memory of the computer system may serve as the data buffer required for RAID control, which is conventionally disposed in the RAID card.

Figure 3:
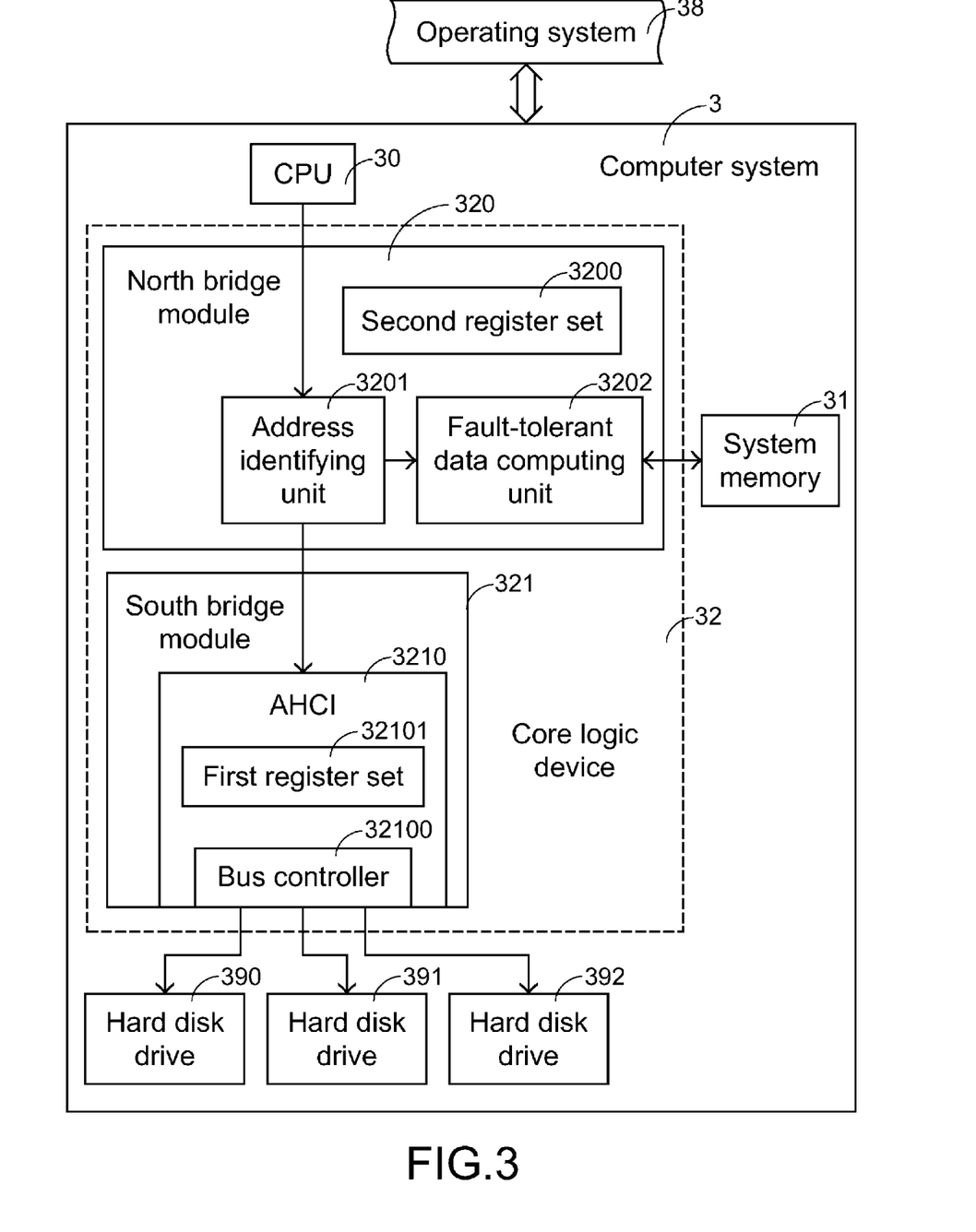
FIG. 3 is a schematic functional block diagram of a core logic device having a RAID control function according to an embodiment of the present invention.

Refer to FIG. 3, which illustrates a schematic functional block diagram of a computer system including a core logic device having a RAID control function according to an embodiment of the present invention. The core logic device 32 in the computer system 3 is electrically connected to a central processing unit (CPU) 30, a system memory 31 and at least three hard disk drives 390, 391 and 392 configured as a RAID, and works with an operating system 38. The core logic device 32 is, for example, a chipset including a north bridge module 320 and a south bridge module 321.

The south bridge module 321 includes a hard disk drive controller, which may be implemented with an advanced host controller interface (AHCI) 3210, and integrated therein a bus controller 32100 and a first register set 32101. An example of the bus controller 32100 is an IDE (Integrated Drive Electronics) controller. The first register set 32101 has an address specified as a PCI device and used for storing information of start address and address range of a first block defined in a memory space managed by the operating system 38. The first block of the memory space is defined for the use of the advanced host controller interface (AHCI) 3210. On the other hand, the north bridge module 320 includes a second register set 3200, an address identifying unit 3201 and a fault-tolerant data computing unit 3202. The second register set 3200 also has an address specified as a PCI device for storing information of a start address and an address range of a second block defined in the memory space managed by the operating system 38. The second block of memory space serves as a data buffer required for the control operation of a RAID such as RAID3, RAID5, etc.

When a command for controlling a peripheral device such as a PCI device is issued by the CPU 30, it is supposed to be transmitted to the south bridge module 321 via the north bridge module 320. In the present embodiment, the address identifying unit 3201 in the north bridge module 320, after receiving the command from the CPU 30, detects an address data included in the command before transmitting it to the south bridge module 321. If the address data is determined to conform to the address of the fault-tolerant data computing unit 3202, which is specified as a PCI device, it means the command relates to a fault-tolerant data computing operation of data in the RAID. Then the command will be transferred to the fault-tolerant data computing unit 3202 to be processed instead of being directed to the south bridge module 321.

Figure 5:
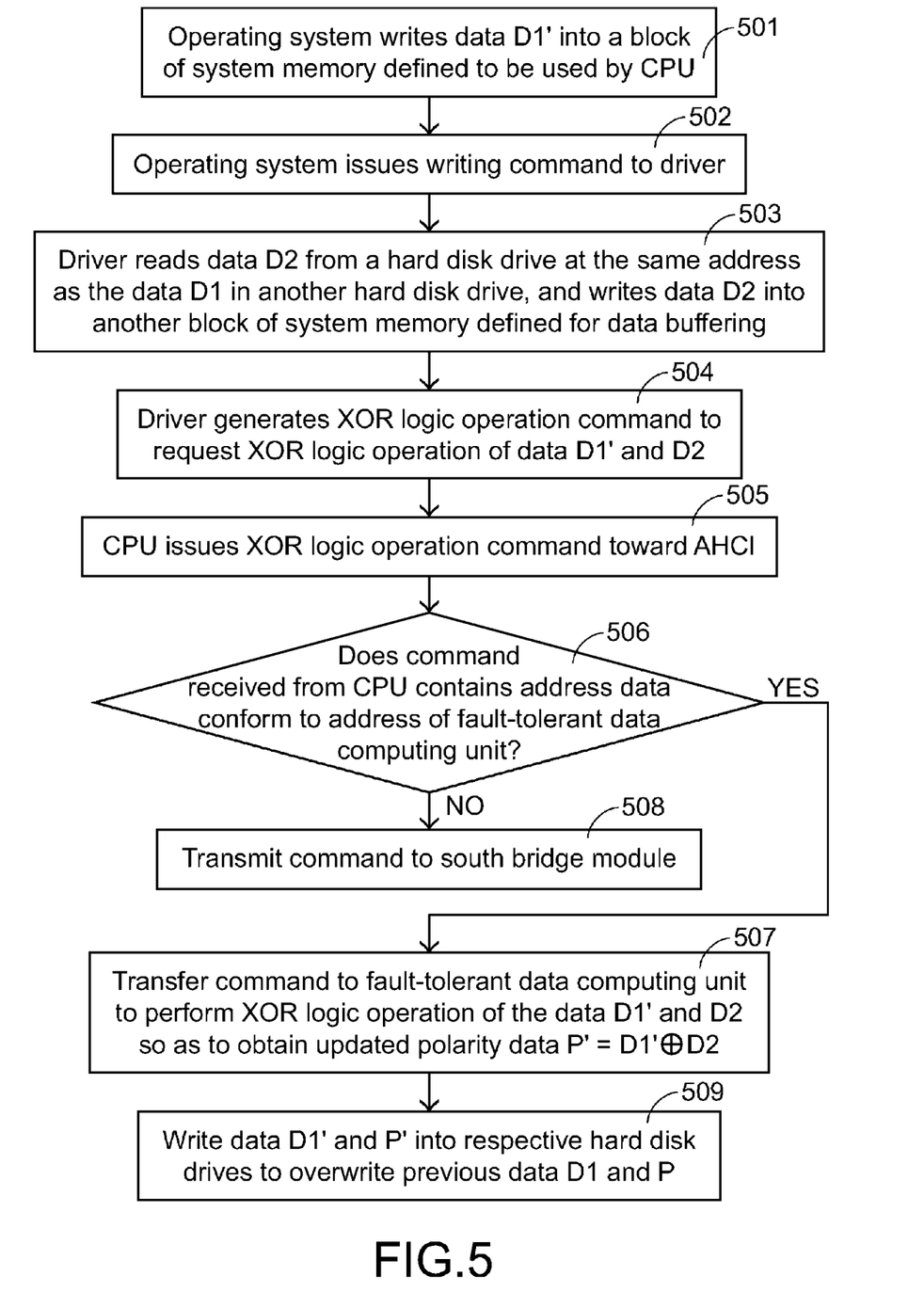
FIG. 5 is a flowchart illustrating a process of writing data into the hard disk drives configured as a RAID according to an embodiment of the present invention.

An example of a process of writing data into the RAID with the application of the above-described RAID control manner is illustrated in the flowchart of FIG. 5. For overwriting a data D1 in the hard disk drive 390 with a new data D1', the operating system 38 first writes the data D1' into a block of the system memory 31, which is defined for the use of the CPU 30 by the operating system 38 (Step 501). Meanwhile, the operating system 38 issues a writing command to a hard disk driver (Step 502). In response to the writing command, the driver reads out a data D2 stored in the hard disk drive 391 at the same address as the data D1 in the hard disk drive 390 and writes the data D2 into another block of the system memory 31, which is defined for data buffering by the operating system 38 (Step 503). Meanwhile, the driver generates an XOR logic operation command to request an XOR logic operation of the data D1' and D2 (Step 504). The CPU 30 then issues the XOR logic operation command toward the AHCI 3210 via the address identifying unit 3201 in the north bridge module 320 (Step 505). The address identifying unit 3201 confirms if the command received from the CPU 30 contains an address data conforming to the address of the fault-tolerant data computing unit 3202 (Step 506). If the address data conforms to the address of the fault-tolerant data computing unit 3202, the command will be transferred to the fault-tolerant data computing unit 3202 to perform the XOR logic operation of the data D1' and D2 so as to obtain an updated polarity data P'=D1'⊕D2 (Step 507). Otherwise, the command will be sent to the south bridge module 321 (Step 508). Then the data D1' and P' can be written into respective hard disk drives 390 and 392 to overwrite the previous data D1 and P (Step 509).

Figure 4:
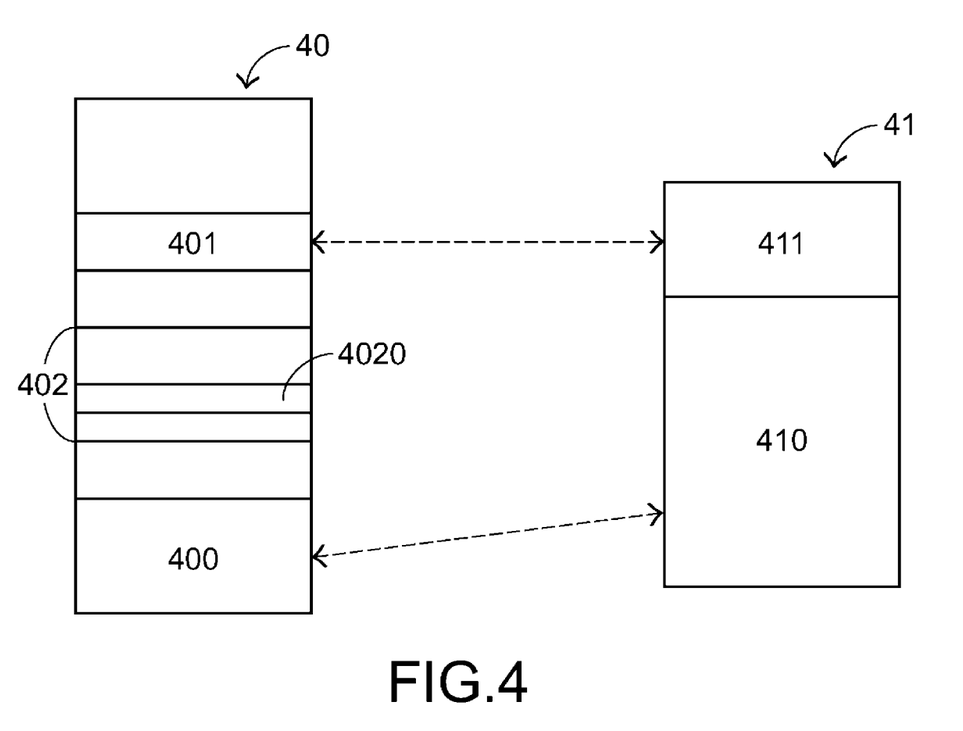
FIG. 4 is a schematic diagram illustrating allocation of memory space managed by an operating system.

In addition to the memory block defined for the CPU and the memory block defined for the data buffer, the operating system further defines a memory block for the AHCI 3210. FIG. 4 schematically illustrates the allocation of a memory space managed by the operating system and the correlation of blocks of the memory space to blocks of the system memory according to an embodiment of the present invention. For example, the memory space 40 managed by the operating system has a size of 4 gigabytes. A first block 402 defined for the use of AHCI 3210 has a start address B0000000h and an address size of 4 k bytes, and a second block 401 defined for data buffering has a start address D0000000h and an address size of 64M bytes. The memory space 40 further includes a third block 400 defined for the use of the CPU. Since the system memory 31 has a memory size of 512M bytes, and the portion 411 of the system memory 31 for data buffering occupies 64M bytes, the address size of the third block 400 is up to 448M bytes. Within the first block 402, a section 4020 is defined for indicating the PCI address of the fault-tolerant data computing unit 3202.

It is understood by those ordinary in the art that the RAID configuration is advantageous due to the data-securing capability. In a case that one of the hard disk drives 390 and 391 is failed, the lost data in the failed hard disk drive (e.g. 391) can be rebuilt according to corresponding data stored in the other hard disk drive (e.g. 390) and the parity data stored in the hard disk drive 392. Hereinafter, a process of rebuilding lost data is illustrated with reference to the flowchart of FIG. 6.

Figure 6:
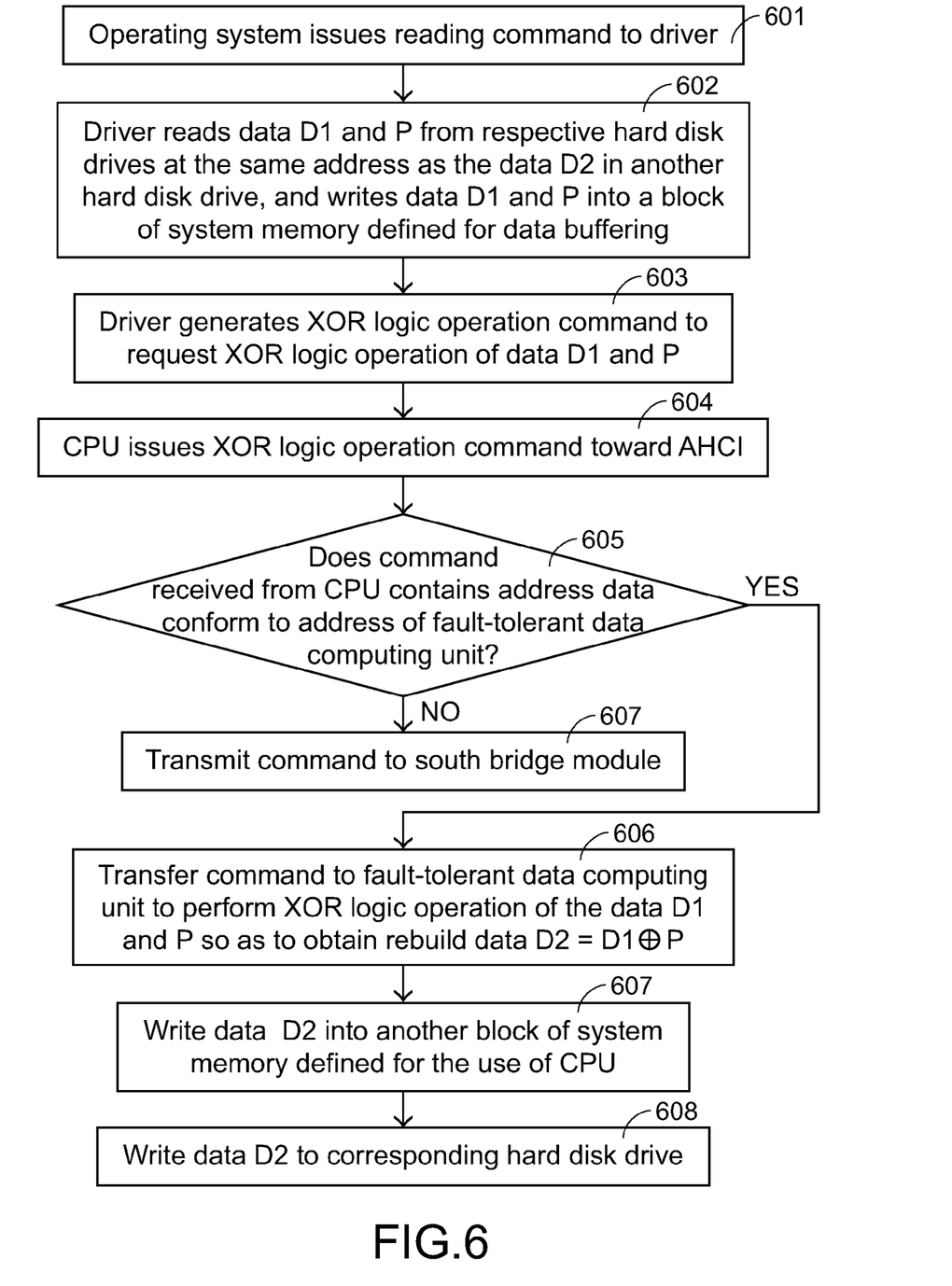
FIG. 6 is a flowchart illustrating a process of rebuilding the data in a failed hard disk drive of a RAID according to an embodiment of the present invention.

For rebuilding a data D2 in the hard disk drive 391, the operating system 38 issues a reading command to the hard disk driver (Step 601). In response to the reading command, the driver reads out a data D1 stored in the hard disk drive 390 at the same addresses as the data D2 in the hard disk drive 391 and a polarity data P stored in the hard disk drive 392 at the same addresses as the data D2 in the hard disk drive 391, and writes the data D1 and P into the block 411 of the system memory 31, which is defined as the block 401 for data buffering by the operating system 38 (Step 602). Meanwhile, the driver generates an XOR logic operation command to request an XOR logic operation of the data D1 and P (Step 603). The CPU 30 then issues the XOR logic operation command toward the AHCI 3210 via the address identifying unit 3201 in the north bridge module 320 (Step 604). The address identifying unit 3201 confirms if the command received from the CPU 30 contains an address data conforming to the address of the fault-tolerant data computing unit 3202 by determining whether the detected address lies in the address range of the block 4020 defined by the operating system (Step 605). If the address data conforms to the address of the fault-tolerant data computing unit 3202, the command will be transferred to the fault-tolerant data computing unit 3202 to perform the XOR logic operation of the data D1 and P so as to rebuild the data D2=D1⊕P (Step 606). Otherwise, the command will be sent to the south bridge module 321 (Step 607). Then the data D2 can be written into another block 410 of the system memory 31, which is defined by the operating system 38 as the block 400 provided for the CPU (Step 608), and is ready to be written back to a corresponding hard disk drive, e.g. the fixed hard disk drive 391 (Step 609).

It is understood from the above embodiments, by disposing a fault-tolerant data computing unit in the north bridge module, the CPU will not be frequently occupied to perform the fault-tolerant data computing operation, compared to the software RAID system. As a result, the performance of the computer system can be enhanced. Furthermore, as the fault-tolerant data computing unit is disposed in the north bridge module nearer from the system memory and CPU than the south bridge module, the fault-tolerant data computing operation can be executed with high efficiency. Aside from, since a block of the system memory is exclusively used by the RAID system, which means that the data buffer implemented with the block of the system memory is within an uncache range, it is not necessary to snoop the CPU to access data in the data buffer. Accordingly, the data access efficiency can be improved. Moreover, by disposing the fault-tolerant data computing unit in the north bridge module but disguising the fault-tolerant data computing unit as in the south bridge module, the allocation of the present RAID system is substantially the same as the RAID card as illustrated in FIG. 2. Since the command for requesting the XOR logic operation is issued forward the south bridge module, it makes no difference between the present RAID system and the RAID card for the driver. Therefore, it is compatible with a common driver.

Alternatively, the fault-tolerant data computing unit may be disposed in the south bridge module, which still is advantageous over the RAID card due to reduced cost and size and also advantageous over the software RAID system due to the exemption from occupying the CPU resource. It is also feasible to dispose the fault-tolerant data computing unit in a chip integrated therein both the north bridge module and the south bridge module.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A core logic device of a computer system having a RAID control function, the computer system including a central processing unit, a system memory and multiple hard disk drives, the core logic device comprising:
   a south bridge module disposed therein a hard disk drive controller in communication with the hard disk drives for controlling the access to the hard disk drives; and
   a north bridge module disposed therein an address identifying unit in communication with the central processing unit for discriminating a command received from the central processing unit, and a fault-tolerant data computing unit in communication with the address identifying unit and the system memory for receiving the command optionally transferred by the fault-tolerant data computing unit and executing a fault-tolerant computing operation of specified data in the system memory according to the command.

2. The core logic device according to claim 1 wherein the command is issued by the central processing unit toward the south bridge module via the address identifying unit.

3. The core logic device according to claim 2 wherein the address identifying unit transfers the command to the fault-tolerant data computing unit instead of the south bridge module when the command contains an address data conforming to an address of the fault-tolerant data computing unit.

4. The core logic device according to claim 1 wherein the hard disk drive controller is an advanced host controller interface (AHCI).

5. The core logic device according to claim 4 wherein the advanced host controller interface includes:
   a bus controller electrically connected to the hard disk drives for controlling the access to the hard disk drives; and a first register set for storing address data associated with a first block of a memory space managed by an operating system of the computer system for the use of the advanced host controller interface.

6. The core logic device according to claim 5 wherein the address data include a start address and an address range of the first block.

7. The core logic device according to claim 5 wherein the first register set has an address specified as a PCI device by the operating system.

8. The core logic device according to claim 1 wherein the north bridge module further includes a second register set for storing address data associated with a second block of a memory space managed by an operating system of the computer system for data buffering.

9. The core logic device according to claim 8 wherein the second block of the memory space is implemented with a block of the system memory.

10. The core logic device according to claim 1 wherein the fault-tolerant data computing operation is an exclusive-or (XOR) logic operation of the specified data that are transferred from respective hard disk drives to the system memory in response to a reading/writing command issued by an operating system of the computer system.

11. A core logic device of a computer system having a RAID control function, the computer system including a central processing unit, a system memory and multiple hard disk drives, the core logic device comprising:
   a hard disk drive controller in communication with the hard disk drives for controlling the access to the hard disk drives;
   an address identifying unit in communication with the central processing unit for discriminating a command received from the central processing unit; and
   a fault-tolerant data computing unit in communication with the address identifying unit and the system memory for receiving the command optionally transferred by the fault-tolerant data computing unit and executing a fault-tolerant computing operation of specified data in the system memory according to the command.

12. A RAID control method for use in a computer system, the computer system including a central processing unit, a system memory, a south bridge module, a north bridge module and multiple hard disk drives, the RAID control method comprising steps of:
   issuing a command addressing to the south bridge module by the central processing unit; and
   performing a fault-tolerant computing operation in the north bridge module while exempting from transmitting the command to the south bridge module when the command contains a specified address data.

13. The RAID control method according to claim 12 wherein the fault-tolerant computing operation is an exclusive-or (XOR) logic operation of specified data in the system memory.

14. The RAID control method according to claim 13 wherein the specified data are transferred from respective hard disk drives to the system memory in response to a reading/writing command issued by an operating system of the computer system.

15. The RAID control method according to claim 12 wherein the specified address data is an address within an address range indicative of a fault-tolerant data computing unit disposed in the north bridge module.

16. The RAID control method according to claim 15 wherein the fault-tolerant data computing unit has an address identified as a PCI device by an operating system of the computer system.

\* \* \* \* \*